United States Patent [19]

Keith

[11] 3,733,437

[45] May 15, 1973

[54] TELEPHONE HANDSET COUPLER

[75] Inventor: Craig L. Keith, San Jose, Calif.

[73] Assignee: Anderson Jacobson, Inc., Sunnyvale, Calif.

[22] Filed: May 20, 1970

[21] Appl. No.: 39,048

[52] U.S. Cl. ..................................................179/1 C

[51] Int. Cl. .............................................H04m 1/14

[58] Field of Search ...179/1 C, 2 C, 180, 181 F, 184; 181/33.01; 248/22, 358

[56] References Cited

UNITED STATES PATENTS

| | | | |
|---|---|---|---|
| 2,402,341 | 6/1946 | Patterson | 179/1 C |
| 3,553,374 | 1/1971 | Wolf | 179/2 C |
| 3,541,261 | 11/1970 | Okleshen et al. | 179/1 C |
| 2,830,780 | 4/1958 | Schloss | 181/33.01 |
| 2,165,546 | 7/1939 | Heller | 179/1 C |

*Primary Examiner*—Kathleen H. Claffy
*Assistant Examiner*—Horst F. Brauner
*Attorney*—Lindenberg, Freilich & Wasserman

[57] ABSTRACT

Apparatus for acoustically coupling a telephone handset to transducers of a data terminal, comprising a pair of cup-like coupling members of rubber or other elastomeric material for holding the mouthpiece and earpiece ends of the handset. Each elastomeric coupling member has an inner wall for snugly receiving a handset end and for holding a data transducer below it, an outer wall that encircles the inner wall and that can be mounted on the data terminal, and a thin membrane that connects the upper ends of the inner and outer walls to support the inner wall while largely isolating it from vibrations.

12 Claims, 4 Drawing Figures

CRAIG L. KEITH
INVENTOR.

BY
Lindenberg Freilich & Wasserman
ATTORNEYS

INVENTOR.
CRAIG L. KEITH
BY
Lindenberg Freilich & Wasserman
ATTORNEYS

TELEPHONE HANDSET COUPLER

BACKGROUND OF THE INVENTION

1. Field of the Invention

This invention relates to apparatus for acoustically coupling a telephone to a data terminal or the like.

2. Description of the Prior Art

An ordinary telephone can be used to connect a portable data terminal to a remote computer, by lifting the telephone handset from its cradle and placing it on a handset-holding assembly of the data terminal. A microphone and speaker of the data terminal are then acoustically coupled to the earpiece and mouthpiece, respectively, of the handset. Although this type of acoustic coupling allows rapid connection to a telephone line, it can result in a high level of extra noise. The noise can arise from extraneous sounds and vibrations entering the microphones of the handset or terminal. Many of these sounds arise from the operation of the typewriter mechanism of the data terminal, and an especially large amount of sounds and vibrations may be picked up where the handset-holding assembly is on the same frame as the typewriter or other mechanical mechanisms of the terminal.

One design which has been employed to reduce pick-up of noise and vibrations, employs resilient cups for receiving each end of the telephone handset. This design, described in U.S. Pat. application Ser. No. 799,822, now U.S. Pat. No. 3,585,302, filed Feb. 17, 1969 by William O. Swan, Jr. and assigned to the same assignee as the present invention, provides for a snug fit of the handset ends with the cup walls to seal out room noise, and employs thin, downwardly depending flanges of resilient material to resist the transmission of vibrations. While the resilient flanges reduce vibration transmission, they add additional height and bulkiness, and require screws or other inconvenient fasteners to hold them to the terminal. Also, there is no isolation from acoustic room noise until the handset is inserted into the cups.

SUMMARY OF THE INVENTION

In accordance with the invention, resilient coupling members are provided for coupling a telephone handset to transducers of a data terminal, which are compact and easy to install, which are highly effective in blocking noise and vibrations, and which prevent transducer operation until proper insertion of the handset. In one embodiment of the invention, an elastomeric coupling member is provided which includes an annular inner wall for snugly receiving an end of a handset, an outer wall which surrounds the inner wall with a space provided between them, and a thin annular membrane for coupling the upper ends of the inner and outer walls.

The outer wall has an annular groove that can receive a flange of a data terminal mounting bracket, to enable rapid installation of the coupling member without screws or other movable fasteners. The outer wall has a second annular groove on its inner surface that holds a ring of rigid material. The ring can abut a ledge formed on the inner wall to prevent excessive downward movement of the inner wall during installation of a handset. The inner wall also has an annular groove, to receive the perimeter of a transducer so that the transducer can be easily installed without auxiliary fasteners. The upper ends of the inner and outer walls are thin to assure high flexibility. The thin upper portion of the inner wall and the top membrane provide for easy insertion of the handset, allow for insertion of a variety of handsets whose ends are of different diameters, and provide a seal between the handset and the coupling member to isolate the transducer from acoustic room noise. A complete handset-holding assembly has two coupling members spaced to readily receive both ends of a telephone handset.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
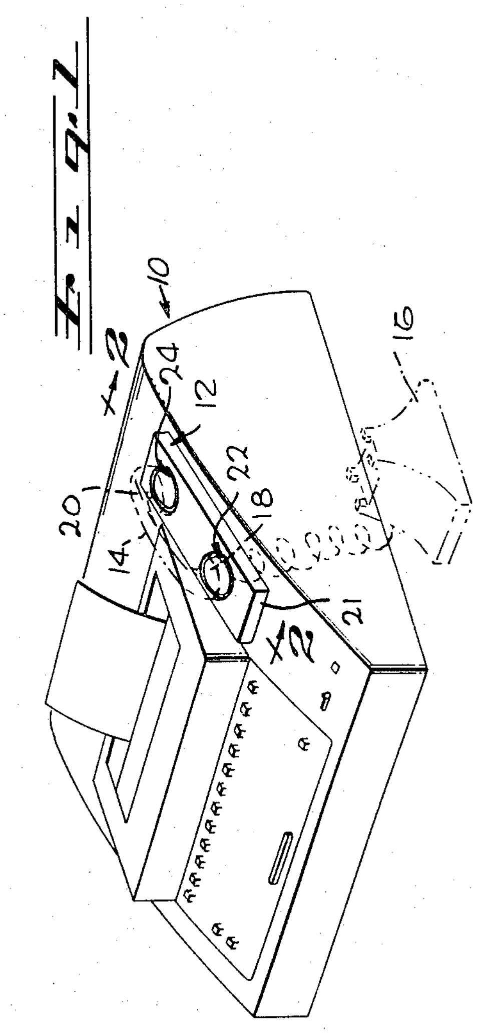
FIG. 1 is a perspective view of a data terminal with handset-holding apparatus constructed in accordance with the invention.

FIG. 1 shows a portable data terminal 10 constructed in accordance with a preferred embodiment of the invention, the terminal having a handset-holding assembly 12 that can hold an ordinary telephone handset 14 that has been lifted off its cradle 16. The holding assembly 12 is designed to receive both the transmitter end or mouthpiece 18 and receiver end or earpiece 20 of the handset, and to make acoustical connections with them through a speaker and microphone in the holding assembly. This allows the data terminal to be easily connected to a telephone line to transmit and receive information from a remote computer, or other terminal device. The data terminal 10 includes a typewriter that may produce noise and vibrations. The holding assembly 12 is constructed to block out such disturbances while providing efficient acoustical coupling to the telephone handset, using a compact and easily maintained structure.

The holding assembly 12 includes a panel 21 which supports a resilient mouthpiece-holding or coupling member 22 and a resilient earpiece-holding, or coupling member 24. The earpiece coupling member 24, best shown in FIGS. 2 and 3, includes an inner wall 26, an outer wall 28, and a membrane 30 that connects upper portions of the inner and outer walls. As shown in the Figures, the inner wall 26 is positioned radially within the outer wall 28, and in fact the inner wall is concentric with the outer wall, although exact concentricity is not important. The earpiece coupling member 24 is molded from an elastomeric material such as a soft rubber. The annular outer wall 28 surrounds the annular inner wall, with an annular space left between them.

The inner wall 26 of the earpiece coupling member 24 has an upper portion 32 that receives the earpiece of a handset in an interference fit, to seal off sounds in the environment. The earpiece can be pushed down until it abuts an upwardly facing ledge 33 on the inner wall. The inner wall 26 also has a thick lower portion with a groove 34 on its inner surface that receives the flange of a bracket that holds a microphone or the flange of the microphone housing. Thus, the microphone of the data terminal is positioned immediately in front of the handset earpiece to receive sounds transmitted by a remote computer over the telephone line.

Figure 2:
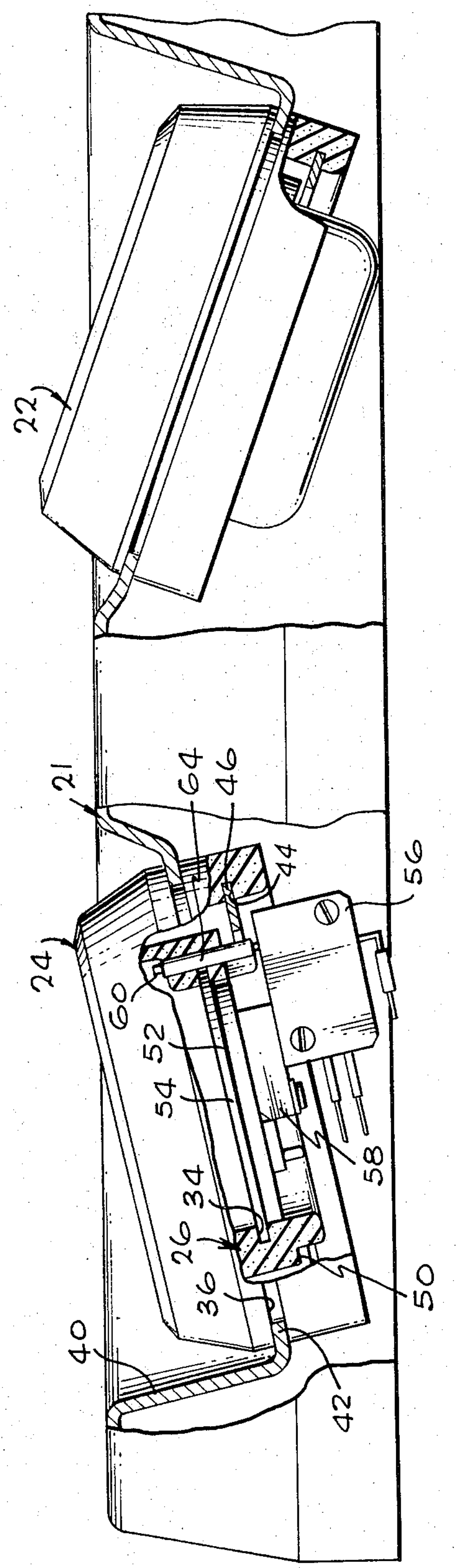
FIG. 2 is a partial view taken on the line 2—2 of FIG. 1.
Figure 3:
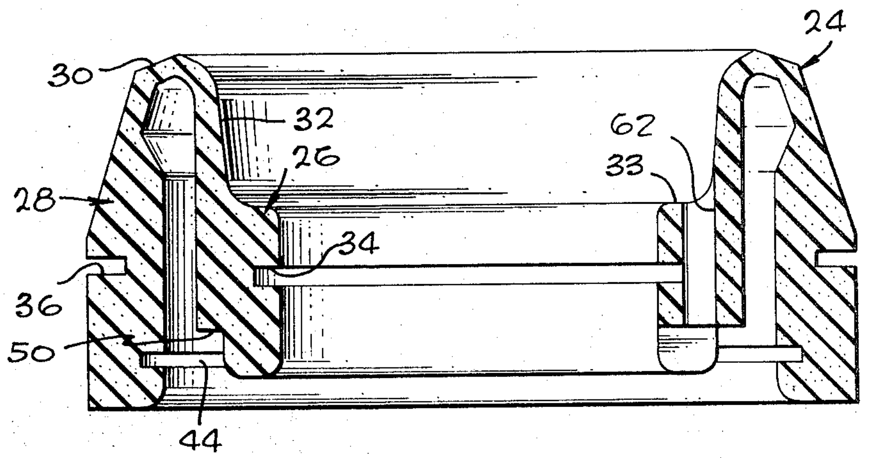
FIG. 3 is a sectional view of a coupling member of the apparatus of FIG. 1, which holds the earpiece end of a telephone handset.

The outer wall 28 of the earpiece coupling member has a thick lower portion with an annular groove 36 on its outer surface. As shown in FIG. 2, the panel 21 of the handset-holding apparatus is formed with a downwardly extending extrusion 40 that has a flange 42 which is received in the outer groove 36 of the earpiece coupling member. The use of a flange that fits into a groove in the coupling member eliminates the need for screws or other movable fasteners, and permits uniform support of the coupling member around its circumference. The lower portion of the outer wall 28 is also formed with an annular groove 44 on its inner surface. This groove 44 is designed to receive a ring 46 of stiff material such as steel, to prevent excessive downward deflection of the inner wall 26. The inner wall 26 is provided with a stepped region on the outer surface of its lower end, which forms a downwardly facing ledge 50. When the inner wall is pushed down with substantial force, during installation of the handset earpiece, the ledge 50 gears against the ring 46 to prevent excessive downward movement by ring 46. The fact that downward movement of the inner wall 26 is limited, allows circuit elements to be located below it, instead of requiring a wall below it.

The construction of the earpiece coupling member 24 with inner and outer walls 26, 28 at about the same height allows for a high degree of compactness. The membrane 30 that joins these walls can be made very thin to readily flex so that shocks or low frequency vibrations are not readily transmitted to the inner wall. The thinness of the membrane also allows it to serve as a high impedance path for higher frequency vibrations or sounds. The thin membrane 30 is highly flexible for small deflections such as result during vibrations, because it then tends primarily to bend like a beam. However, the membrane resists larger deflections more strongly, partly because larger deflections result in a deformation that requires greater stretching of the membrane, instead of primarily bending. Thus, even if the ring 46 and ledge 50 were not present, large downward deflections would be resisted.

As shown in FIG. 2, a microphone 52 is held in the earpiece coupling member 24 by reception of a flange 54 on the microphone in the groove 34. A switch 56 is mounted by a bracket 58 on the microphone to sense the reception of a handpiece end in the coupling member. The switch 56 has a plunger 60 that projects through a hole 62 in the earpiece coupling member so that it is depressed as a handpiece is fully installed. A guide 64 mounted in the hole 62 helps prevent sticking of the plunger. The switch prevents actuation of the system by room noise, prior to full seating of the earpiece. Of course, once the earpiece is fully seated it seals out room noise.

Figure 4:
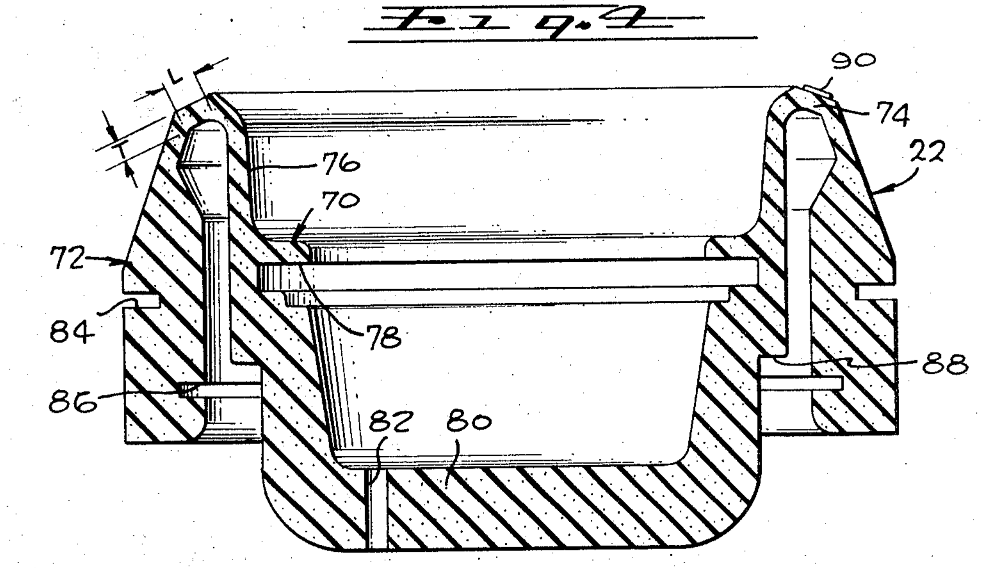
FIG. 4 is a sectional view of a coupling member of the apparatus of FIG. 1, which holds the mouthpiece end of a telephone handset.

The mouthpiece coupling member 22 has a construction largely similar to that of the earpiece coupling member. As shown in FIG. 4, the mouthpiece coupling member includes an annular inner wall 70, an annular outer wall 72 surrounding and spaced outwardly from the inner wall, and a membrane 74 connecting the upper end portions of the walls. The inner wall has an upper region 76 for receiving the mouthpiece of a telephone handset, and a groove 78 for holding a speaker to face the handset mouthpiece. The lower end of the inner wall has a bottom wall 80 with a hole 82 for passing wires that connect the speaker to the rest of the data terminal.

The outer wall 72 has a thickened lower portion with a groove 84 on its outer surface for mounting to a bracket or cover. A groove 86 in the inner surface of the outer wall can hold a stiff ring that abuts a ledge 88 formed in the inner wall to prevent excessive downward deflection of the inner wall, as discussed above for the earpiece coupling member. The membrane 74 is constructed in the same manner as the earpiece coupling member, except that it has the "CORD" molded thereon at 90 to indicate that the handset should be installed with the cord trailing from that location.

For a typical handset with an earpiece 20 and mouthpiece 18 of approximately 2¼ inches diameter, coupling members can be employed of soft rubber with a membrane thickness T (see FIG. 4) less than about 1/10 inch and a length L greater than its thickness. Such a configuration has been found to provide adequate support of the inner wall while resisting the transmission of vibrations.

Although particular embodiments of the invention have been described and illustrated herein, it is recognized that modifications and variations may readily occur to those skilled in the art and, consequently, it is intended that the claims be interpreted to cover such modification and equivalents.

What is claimed is:

1. Apparatus for accoustically coupling a telephone handset to a terminal comprising:

a handset coupler of resilient material having an annular outer wall for mounting on the terminal, an annular inner wall on said coupler spaced radially inwardly of and located within said outer wall a distance sufficient to preclude abutting engagement therebetween at any time, an integral connecting portion on said coupler joining said inner wall and said outer wall and movably supporting said inner wall relative to said outer wall, while largely isolating said inner wall from mechanical vibrations impressed on said outer wall from the terminal, and a support for engaging and holding an end of said handset on said inner wall, so that any vibrations from said terminal are transmitted to the end of said handset substantially only through said outer wall and said connecting portion and said inner wall.

2. The apparatus as defined in claim 1 and including a terminal having means engaging only a relatively narrow width portion of said outer wall and providing the only support for said coupler relative to the terminal.

3. Apparatus for accoustically coupling a telephone handset to a terminal comprising:

a handset coupler of resilient material having an annular outer wall for mounting on the terminal, an annular inner wall on said coupler spaced radially inwardly of and located within said outer wall, an integral connecting portion on said coupler joining said inner wall and said outer wall and movably supporting said inner wall relative to said outer wall while largely isolating said inner wall from mechanical vibrations impressed on said outer wall from the terminal, a portion of said inner wall being formed to receive and hold an end of the handset in spaced relationship to the terminal and said outer wall, said inner wall being axially movable relative to said outer wall upon engagement of the end of the handset with said portion of said inner wall, and having a stepped region on its radially outer surface forming a downwardly facing ledge, said outer wall having a groove formed in its radially inner surface, and a ring-like member mounted in said groove and located for abutting engagement with said ledge upon axial movement of said inner wall.

4. Apparatus for coupling to a handset comprising:

a handset coupler of highly elastic material, having a substantially annular inner wall for receiving an end of said handset and for supporting a transducer, said inner wall having upper and lower end portions, said coupler having an annular outer wall surrounding and spaced outwardly from said inner wall, said outer wall having upper and lower portions, and said coupler also having an annular membrane integral with said upper end portions of said inner and outer walls to connect them; and a terminal having a portion engaged with said outer wall of said coupler to support it so that said inner wall can move relative to said outer wall.

5. The apparatus described in claim 4 wherein:

said inner and outer walls have thin upper portions that merge with said membrane, and lower portions thicker than their respective upper portions, said upper portion of said inner wall constructed to receive said end of said handset in an interference fit therewith.

6. The apparatus described in claim 4 wherein:

said lower end portion of said outer wall has an annular groove on its outer surface, for receiving a mounting bracket flange; and said terminal has a flange for reception in said groove of said outer wall.

7. Apparatus for coupling a handset to a terminal comprising:

a handset coupler of elastic material, having a substantially annular inner wall for receiving an end of said handset and for supporting a transducer, said inner wall having upper and lower end portions, said coupler having a substantially annular outer wall surrounding and spaced outwardly from said inner wall for mounting on said terminal, said outer wall having upper and lower portions, and said coupler also having a substantially annular membrane integral with said upper end portions of said inner and outer walls to connect them;

said upper end portion of said inner wall having a handset receiving portion with a handset-abutting part forming an upwardly facing ledge and an aperture extending through said handset abutting part; and a switch mounted on said inner wall and having an operating element extending through said aperture in said handset-abutting part to detect the seating of a handset end.

8. Apparatus for accoustically coupling a telephone handset, having an annular communication end portion, to a transducer in a terminal and comprising:

a rigid support housing for mounting said handset on the terminal, an opening in said housing to receive the end portion of the handset, a coupling member mounted in said opening to support the end portion of the handset relative to said support housing and reduce transmission of vibrations therebetween and to connect the end portion of the handset to the transducer and limit outside sound transmission thereto, said coupling member being made of a resilient deflectable relative nonvibratable and sound deadening material and comprising:

an annular outer wall extending axially through said opening, attachment means fixedly connecting said outer wall to said support housing, an annular inner wall radially inwardly spaced from said outer wall and extending axially therewithin, a resilient deflectable integral connecting portion extending radially between adjacent end portions of said inner wall and said outer wall, and permitting axial movement of said inner wall relative to said outer wall between a normal unstressed axial position and a resiliently displaced axial position, an annular end portion receiving cavity defined by radially inwardly facing portions of said inner wall having a diameter less than the diameter of the end portion of the handset so as to be sealingly engageable therewith, said inner wall being axially movable relative to said outer wall by resilient deflection of said connecting portion as the end portion of the handset is placed in sealing engagement with said portions of said inner wall within said end portion receiving cavity, a first radially extending abutment surface on said inner wall, a second radially extending abutment surface on said outer wall and extending radially beyond said first radially extending abutment surface for abutting engagement therewith to limit axial movement of said inner wall relative to said outer wall, a transducer cavity defined by radially inwardly facing portions of said inner wall axially spaced from said end portion receiving cavity, a transducer mounted in said transducer cavity in accoustically sealed relationship to said inner wall, and an accoustically sealed transmission chamber defined by said inner wall and said end portion of said handset and said transducer.

9. Apparatus for accoustically coupling a telephone handset, having an annular communication end portion, to a transducer in a terminal and comprising:

a support housing for mounting the handset on the terminal, a radially extending support flange on said housing defining an annular opening, an end portion receiving member mounted in said annular opening and being made of a resilient deflectable material and comprising:

an annular outer wall extending axially through said annular opening, a radially outwardly facing annular groove in said outer wall receiving said support flange and providing the sole means of support for said member relative to said housing, an annular inner wall radially inwardly spaced from said outer wall a distance sufficient to prevent abutting engagement therebetween and extending axially therewithin, a resilient deflectable integral connecting means extending radially between said inner wall and said outer wall and permitting axial movement of said inner wall relative to said outer wall and limiting transmission of vibrations between said outer wall and said inner wall, an annular end portion receiving cavity within said inner wall and defined by radially inwardly facing resilient portions thereof and having a diameter less than the diameter of the end portion of the handset so as to be sealingly engageable therewith to prevent transmission of sound therebetween, said inner wall being axially movable relative to said outer wall by resilient deflection of said connecting means as the end portion of the handset is placed in sealing engagement with said portions of said inner wall within said end portion receiving cavity, cooperable abutment means on said inner wall and said outer wall engageable upon axial movement of said inner wall relative to said outer wall a predetermined distance, an axially extending sound transmission chamber within said inner wall adjacent said end portion receiving cavity, and a sound transducer sealing associated with said inner wall at one end of said sound transmission chamber opposite said end portion receiving cavity.

10. Apparatus for accoustically coupling a transmitter end and a receiver end of a telephone handset to a receiving transducer and a transmitting transducer, respectively, of a terminal and comprising:

a housing mounted on the terminal, a first radially extending flange on said housing defining an annular transmitter opening, a second radially extending flange on said housing defining an annular receiver opening, a resilient transmitter end holding member fixedly mounted in said transmitter opening and comprising:

an annular outer wall extending through said transmitter opening, a radially outwardly facing annular groove in said annular outer wall receiving said first radially extending flange and providing the sole means of support for said transmitter end holding member relative to said housing, an annular inner wall extending through said transmitter opening and being radially inwardly spaced from said annular outer wall a distance sufficient to prevent abutting contact therebetween, an annular integral resiliently deflectable connecting wall portion extending between adjacent ends of said annular outer wall an said annular inner wall, an annular transmitter end receiving cavity defined by radially inwardly facing portions of said annular inner wall having a diameter less than the diameter of the transmitter end so as to be sealingly engageable therewith, said annular inner wall being axially movable relative to said annular outer wall by resilient deflection of said connecting wall portion when the transmitter end is placed within said transmitter end receiving cavity, a radially extending abutment surface on said inner annular wall, a radially inwardly facing groove in said outer wall, an abutment plate mounted in said inwardly facing groove and extending radially inwardly beyond said abutment surface for abutting engagement therewith to limit axial movement of said inner wall relative to said outer wall, an annular axially extending transmission opening in said inner annular wall, a radially inwardly facing transducer groove in said inner annular wall located adjacent said transmission opening, a receiver transducer having a radially outwardly extending annular flange sealingly mounted in said transducer groove in axially spaced relationship to said transmitter end and defining a sealed accoustical chamber therebetween, a resilient receiver end holding member fixedly mounted in said receiver opening and comprising:

an annular outer wall extending through said receiver opening, a radially outwardly facing annular groove in said annular outer wall receiving said second radially extending flange and providing the sole means of support for said receiver end holding member relative to said housing and accoustically sealing the space therebetween, an annular inner wall extending through said receiver opening and being radially inwardly spaced from said annular outer wall a distance sufficient to prevent abutting contact therebetween, an integral annular resiliently deflectable connecting wall portion extending between adjacent ends of said annular outer wall and said annular inner wall and movably supporting said inner wall within said outer wall, an annular receiver end receiving cavity defined by radially inwardly facing resilient portions of said annular inner wall having a diameter less than the diameter of said receiver end so as to be sealingly engageable therewith, said annular inner wall being axially movable relative to said annular outer wall by resilient deflection of said connecting wall portion when the receiver end is placed within said receiving end cavity, a radially extending abutment surface on said inner wall, a radially inwardly facing groove in said outer wall, an abutment plate mounted in said inwardly facing groove and extending radially inwardly beyond said abutment surface for abutting engagement therewith to limit axial movement of said inner wall relative to said outer wall, an annular axially extending transmission opening in said inner annular wall, a radially inwardly facing transducer groove in said inner annular wall located adjacent said transmission opening, and a transmitter transducer having a radially outwardly extending annular flange sealingly mounted in said transducer groove in axially spaced relationship to said receiver end and defining a sealed accoustical chamber therebetween, and the abutment plates being located relative to the terminal so as to hold the handset in spaced relationship to the terminal, the inner walls being the sole support for the handset relative to the terminal.

11. Apparatus for accoustically coupling a transmitter end and a receiver end of a telephone handset to a receiving transducer and a transmitting transducer, respectively, of a terminal and comprising:

support means for the handset on the terminal, an annular transmitter opening on the support means, an annular receiver opening on the support means, each opening having a resilient handset end holding member fixedly mounted therein comprising:

an annular outer wall extending through the opening, attachment means on a portion of said outer wall fixed to the support means adjacent the opening and providing the sole means of support for the holding member relative to the terminal, an annular inner wall extending through the opening, an integral resiliently deflectable connecting wall portion extending between adjacent ends of said outer wall and said inner wall, and limiting vibrational transmission between the terminal and the inner wall, a handset end receiving cavity defined by radially inwardly facing portions of said inner wall having a diameter less than the diameter of the handset end so as to be accoustically sealingly engageable therewith, said inner wall being axially movable relative to said outer wall by resilient deflection of said connecting wall portion when the headset end is placed within said handset end receiving cavity, abutment means engageable with said inner wall to limit axial movement thereof relative to said outer wall, an accoustically sealed axially extending transmission opening in said inner annular wall adjacent and connected to said handset end receiving cavity, transducer receiving means on said inner wall adjacent and connected to said transmission opening and accoustically sealingly receiving the transducer and defining a sealed accoustical chamber between the handset end and the transducer, and the abutment means being located relative to the terminal so as to hold the handset in spaced relationship to the terminal, the inner walls being the sole support for the handset relative to the terminal.

12. The invention as defined in claim 11 and having transducer switch means operable by movement of said inner wall into engagement with said abutment means to connect the handset to the terminal.

* * * * *